3 Sheets—Sheet 1.

J. PERKINS.
Corn Husker.

No. 16,023.

Patented Nov. 4, 1856.

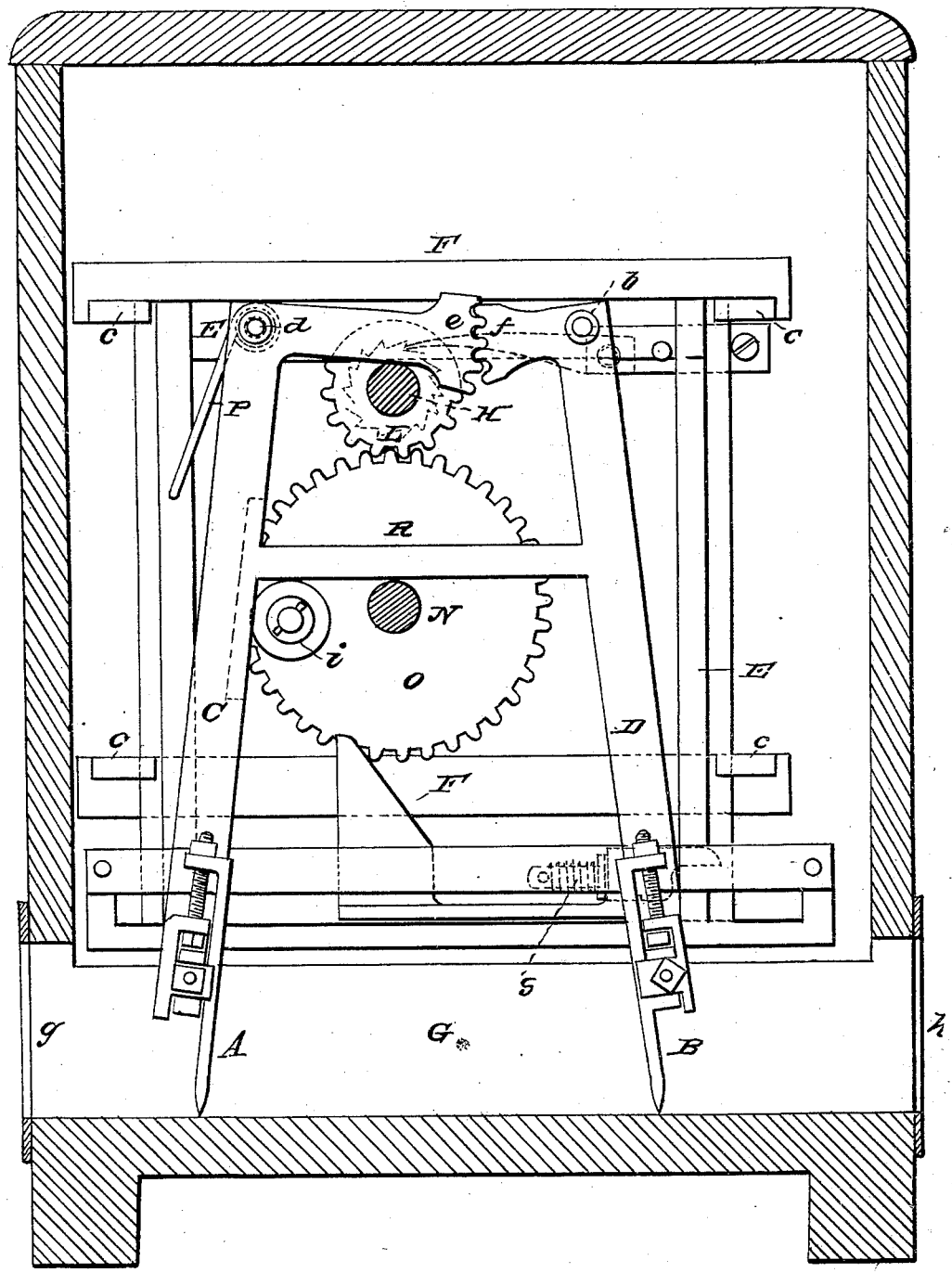

J. PERKINS.

Corn Husker.

No. 16,023.

3 Sheets—Sheet 3.

Patented Nov. 4, 1856.

UNITED STATES PATENT OFFICE.

JOSHUA PERKINS, OF WEST KILLINGBY, CONNECTICUT.

MACHINE FOR HUSKING CORN.

Specification of Letters Patent No. 16,023, dated November 4, 1856.

*To all whom it may concern:*

Be it known that I, JOSHUA PERKINS, of West Killingby, in the county of Windham and State of Connecticut, have invented an Improved Machine for Husking Maize; and I do hereby declare that the same is fully described and represented in the following specification and the accompanying drawings, of which—

Figure 1:
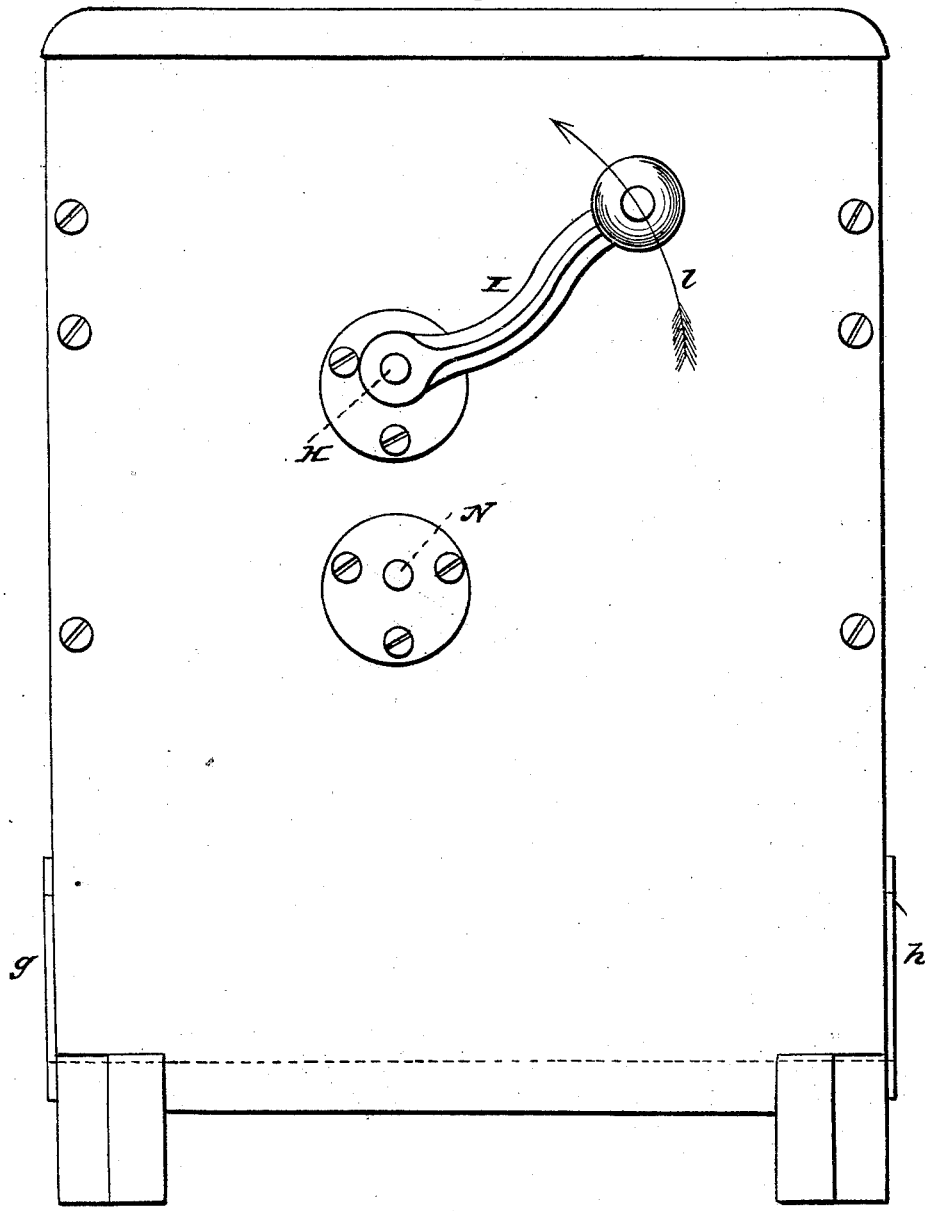
Figure 3:
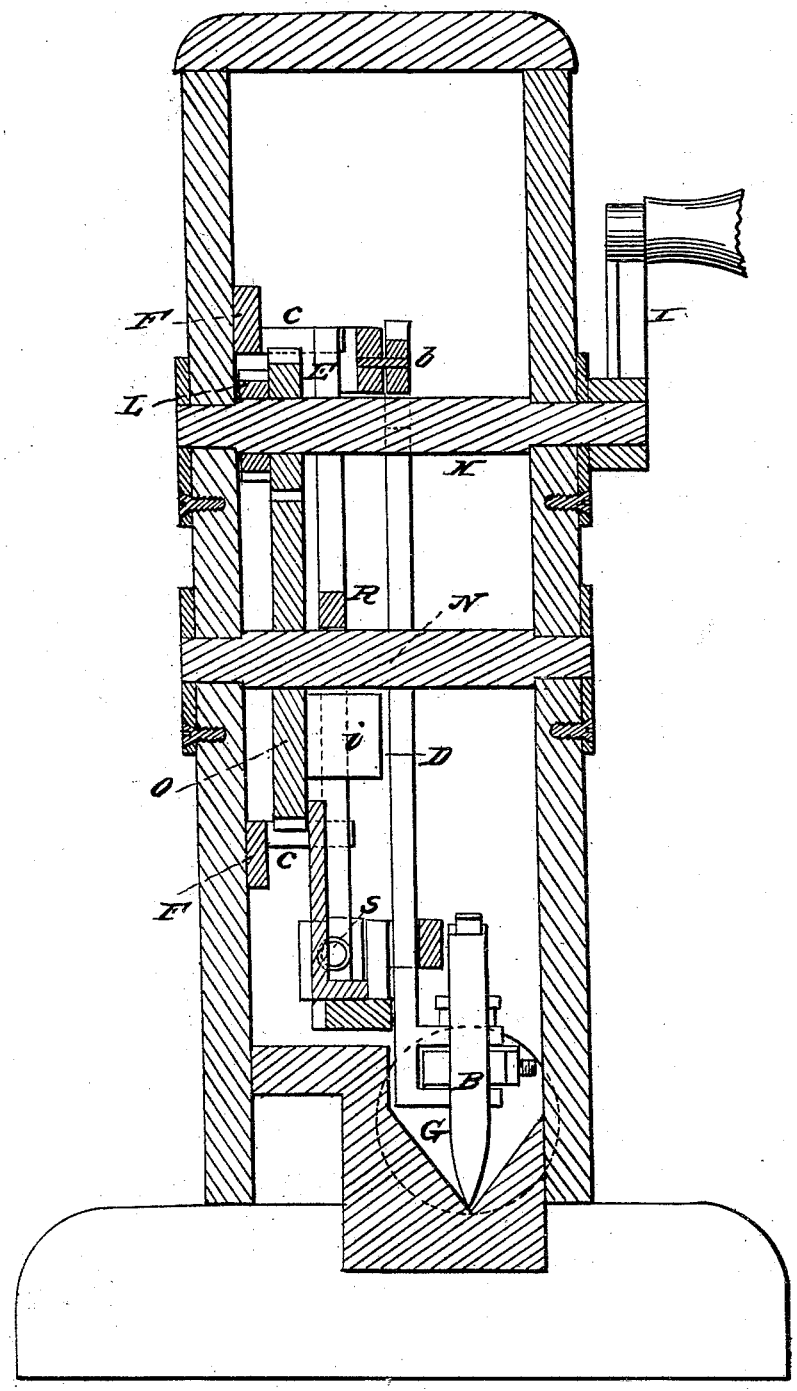

Figure 1, is a front elevation of my said machine. Fig. 2, a vertical and longitudinal section of it, taken just in front of its chisels and so as to show the mechanism by which they are operated. Fig. 3, is a transverse and vertical section taken through the driving shaft.

I am aware that on the 4th of October, 1853, Letters Patent of the United States (numbered 10070) were granted on certain improvements in husking maize. Although my machine contains some of the principles or features of mechanism described in the specification of the said Letters Patent, it has sundry improvements which render it very simple in construction and operation as well as valuable as far as utility is concerned. Therefore with reference to the machine described in said patent it is an improved machine; and I would remark that I lay no claim to the invention of the construction and operation of the so patented machine, wherein two chisels applied to sliding gates are used, and are not only raised and made to descend and pierce the cob, but one is held stationary while the other is moved laterally, so as to draw the ear of maize from the husk, the said husk subsequently being moved out of the machine by an elbow lever or contrivance entirely separate from either of the chisels.

By my improvement both chisels after their entrance into the cob are made movable apart from one another in opposite directions, so that while one is in the act of discharging the ear from the machine, the other shall discharge or cause the discharge of the husk therefrom, and thus for the purpose of discharging the husk from the machine, I entirely dispense with any "elbow lever" or contrivance separate from the chisels I also cause both chisels to so operate that when they descend into the cob they may pass into it in close contact with one another so as to form but one hole in it, thereby preventing more or less injuries to the kernels of maize by the action of the chisels.

In the use of the machine it is intended that the cob shall be presented to the cutters in such portions as to cause them both to pass through the stalk and between the ear and the roots of the husk or its joinings with the stalk.

In the drawings A, B, exhibits the two cutters or chisels as fastened respectively to the longer arms of two bent levers C, D, whose fulcra $a$, $b$, are supported by a frame E, which slides vertically in guides $c$, $c$, $c$, $c$, applied to and within a main frame F. The upper or shorter arms of the two levers C, D, have geared sectors $e$, $f$, on their inner ends, the same serving to so connect the two levers that when one of them is moved laterally in one direction on its fulcrum the other will be moved simultaneously in an opposite direction. Below the chisels and in the frame F, there is arranged a trough or bed G, which is open at both ends as shown at $g$, $h$, in Figs. 2 and 3. Extending across the main frame F, is a driving shaft, H, having a crank I, on its outer end, and a pinion gear on or near its inner end. It also has in rear of said pinion gear a ratchet L, with which a retaining spring pawl affixed to the frame F, operates and so as to prevent the driving shaft from being turned backward or out of its proper direction. On another shaft N arranged transversely in the frame F, and below the driving shaft as shown in Figs. 2 and 3, a geared wheel $o$, is affixed; the said gear wheel is provided with a friction roller. $i$, which is applied to its front side in the position as shown in Figs. 2 and 3. The lower or longer arm of the lever, C, should be made somewhat wider than the corresponding arm of the lever, D, and both should be arranged in such manner that during the rotation of the wheel $o$, the roller $i$ may pass by the lever D, and strike in contact with the other lever C, or the lower arm thereof so as to move the said arm laterally toward the end of the frame F, or in other words toward the entrance opening, $g$, hereinbefore mentioned. In consequence of the peculiar manner in which the two levers are connected, the lever D, will be moved laterally toward the exit opening $h$, at the same time that the lever C, is made to approach the opening $g$. A spring P, is applied to the frame E, and the lever C, in such manner as to cause the longer arms of the two levers with their chisels to approach one another and bring the chisels into contact immediately after the roller, *i*, may have ceased to press the lever C, laterally, the chisels by the action of the spring being brought in contact or close contiguity so that during their descent they may pass into the cob in one cut or hole.

The two chisels may be operated together or one may extend a little beyond the other as shown in the drawings. After the roller *i*, has been made to separate the chisels to the extent of their lateral movements asunder, it is carried by the further rotation of the gear *o*, against the underside of the cross bar, R, of the frame E, and raises the said frame upward. When the said frame has attained its highest elevation a spring bolt *s*, arranged as seen in Fig. 2, is made to operate so as to latch said frame and hold it upward until the roller *i*, shall descend far enough to come in contact with an arm or cam *k*, and move said arm and bolt backward sufficiently to enable the frame E, to fall downward far enough to drive the chisels through the stalk of an ear of corn when the same may be laid in the trough G. In order to prevent the frame E, from descending too far, it may have suitable shoulders or stops applied to it and the frame F, by which it is supported.

Figure 4:
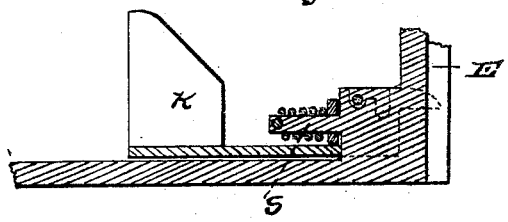

In Fig. 4, I have exhibited a sectional view of the spring bolt *s*, and that part of the frame E, with which it operates, in order to maintain its frame E, elevated during the descent of the roller *i*.

In using the above described machine an ear of corn with the husk upon it, is first passed butt end foremost into the trough G, and through its opening, *g*, and so as to present the ear in a proper manner to the chisels; this having been accomplished the crank I, may be put in rotation in the direction described by the arrow *l*, in Fig. 1, the frame E, being supposed to be at its highest elevation. As soon as the roller, *i*, forces back the bolt *s*, the frame E, and the chisels A, and B, will fall, and the chisels will pierce the stalk of the ear: they will pass through the stalk and separate it from the ear they being made wide enough to accomplish the result. Next by the continued movement of the gear *o*, and its roller, *i*, the chisels will be forced apart simultaneously so as to separate the husk from the ear of maize and to press both in opposite directions, the ear being driven out of the opening *g*, while the husk is forced toward the opening *h*, and is discharged out of the same by the next husk so moved toward the opening *h*.

Having thus described my invention I claim—

The improvement of so operating the two cutters or chisels A and B that during their descent into the stalk of the cob they may pass into it in contact with each other, so as to pierce but one hole, and thereafter receive a lateral motion, simultaneously, in opposite directions, so that while one chisel or cutter is made to discharge the husk from the machine, the other is caused to discharge the ear therefrom. in the manner described.

In testimony whereof, I have hereunto set my signature this 9th day of July A. D. 1856.

JOSHUA PERKINS.

Witnesses:
 R. H. EDDY,
 F. P. HALE, Jr.